(12) United States Patent
Nagano (10) Patent No.: US 8,422,066 B2
(45) Date of Patent: Apr. 16, 2013

(54) IMAGE FORMING APPARATUS

(75) Inventor: Daisaku Nagano, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 1161 days.

(21) Appl. No.: 12/290,709

(22) Filed: Nov. 3, 2008

(65) Prior Publication Data
US 2009/0116076 A1 May 7, 2009

(30) Foreign Application Priority Data

Nov. 2, 2007 (JP) ................................. 2007-285788
Nov. 2, 2007 (JP) ................................. 2007-285789

(51) Int. Cl.
*G06K 15/00* (2006.01)
*G06F 3/12* (2006.01)
*H04N 1/00* (2006.01)

(52) U.S. Cl.
USPC ........ 358/1.16; 358/1.13; 358/1.15; 358/402; 358/403; 358/404

(58) Field of Classification Search ................. 358/1.13, 358/1.15, 1.16, 402, 403, 404
See application file for complete search history.

(56) References Cited

U.S. PATENT DOCUMENTS

| 7,052,190 B2 * | 5/2006 | Ishii | 400/62 |
| 7,180,612 B2 * | 2/2007 | Shimizu | 358/1.13 |
| 7,567,360 B2 * | 7/2009 | Takahashi et al. | 358/1.15 |
| 8,164,765 B2 * | 4/2012 | Anno et al. | 358/1.13 |
| 2006/0285140 A1 * | 12/2006 | Ehara | 358/1.13 |

FOREIGN PATENT DOCUMENTS

| JP | 2002-049614 | 2/2002 |
| JP | 2004-070858 | 3/2004 |
| JP | 2005-039383 | 2/2005 |
| JP | 2005-275490 | 10/2005 |
| JP | 2006-203327 | 8/2006 |
| JP | 2006-333352 | 12/2006 |

* cited by examiner

*Primary Examiner* — Twyler Haskins
*Assistant Examiner* — Jonathan Beckley
(74) *Attorney, Agent, or Firm* — Jordan and Hamburg LLP (57) ABSTRACT

A document management section 77 updates and manages stored information in an additional information storage section 74 in such a manner that when details of operation information having been acquired in an operation information acquisition section 71 regard an operation of reading all the pages that is an operation targeting all the pages of an unread document, the current status of processing of the document is changed from unread to read, whereas when the details of operation information regard an operation of reading a part of the pages that is an operation targeting a part of the pages of an unread document, the current status of processing of the document is changed from unread to hold. By this means, a current status of a management target document that changes every moment can be updated and managed in detail in real time.

4 Claims, 6 Drawing Sheets

IMAGE FORMING APPARATUS

FIELD OF THE INVENTION

This invention relates to an image forming apparatus having a document management function, and in particular, relates to an image forming apparatus capable of highly detailed updating and managing in real time, a current status of a management target document which changes every moment.

DESCRIPTION OF THE RELATED ART

In image forming apparatuses including, for example, a facsimile machine, a printer, or a multifunction device of those, one having a document management function has been conventionally known. In the image forming apparatus of this kind, a document related to an image having been received by facsimile or an image having been read via a scanner is accumulated and managed in a predetermined storage area generally called a document box. A user accesses a document accumulated and managed in a required document box via an operation panel or a network, thereupon being able to read its details or image-form and output the details on a sheet of recording paper.

As an example of image forming apparatuses having such a document management function, the present inventor has proposed an art of an image forming apparatus configured to include a print section, a scanner section, and a facsimile section, having a document image database in which document image data is accumulated and a document image management section having a copyright processing section and a bar code processing section, wherein the copyright processing section has a function of determining whether copyright information is added to document image data having been input into the image forming apparatus, and in the case of document image data having been added with copyright information, bar code data is added to the document image data in the bar code processing section, whereby the document image having been added with the copyright information by barcode can be identified with ease (see Japanese Published Unexamined Patent Application No. 2005-47142, for example).

However, the art described in the aforementioned Application cannot update and manage in high detail in real time, a current status of a management target document that changes every moment.

SUMMARY OF THE INVENTION

Accordingly, it is an object of the present invention to obtain an image forming apparatus capable of highly detailed updating and managing in real time, a current status of a management target document that changes every moment.

In order to achieve the foregoing object, an image forming apparatus according to the present invention includes a document accumulation section in which information on each of a plurality of documents is accumulated, an additional information storage section storing additional information on a current status of processing of each of the plurality of documents as associated with each relevant document, a display section for displaying various information on each of the plurality of documents on a display screen, an operation information acquisition section acquiring operation information when a user specifies an operation for a document in line with his/her intention and its relevant processing from among the various information on documents displayed on the display screen, a current status determination section determining a current status of processing of the document based on the operation information having been acquired in the operation information acquisition section, and a document management section updating and managing stored information in the additional information storage section based on the current status of processing of the document having been stored in the additional information storage section and the current status of processing of the document having been determined in the current status determination section.

OPERATION AND EFFECTS OF THE INVENTION

In the image forming apparatus according to the present invention, the document management section determines a current status of processing of the document based on the operation information having been acquired in the operation information acquisition section and also updates and manages stored information in the additional information storage section based on the current status of processing of the document having been stored in the additional information storage section and the determined current status of processing of the document. Thus, a current status of a management target document that changes every moment can be updated and managed in high detail in real time.

DETAILED DESCRIPTION OF THE INVENTION

Hereinafter, an image forming apparatus according to an embodiment of the present invention is described in detail with reference to the drawings. A digital color copier having a document management function is exemplified and described below as the image forming apparatus according to the present invention.

Figure 1:
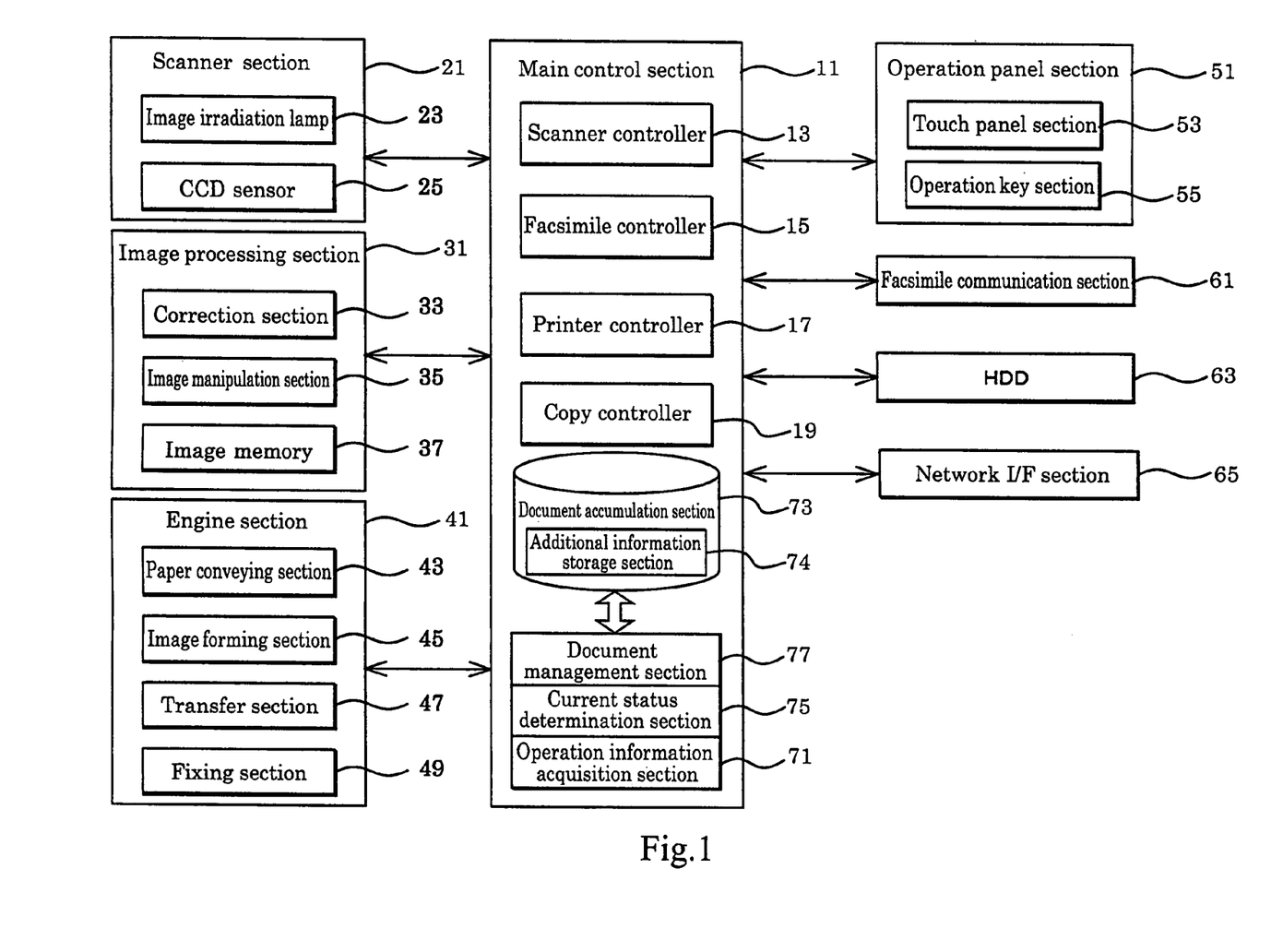
FIG. 1 is a block diagram showing a general configuration around an image forming apparatus according to an embodiment of the present invention.

Various functions including print output, a scanner, facsimile transmission, mail transmission, and data transmission are available in the digital color copier, which is controlled by a main control section 11 composed of a microcomputer and dedicated hardware circuitry, etc. As input/output devices connected to the main control section 11 and taking charge of various functions, the copier includes a scanner section 21, an image processing section 31, an engine section 41, an operation panel section 51, a facsimile communication section 61, a hard disk drive (HDD) 63, and a network interface (I/F) section 65.

The main control section 11 houses a scanner controller 13 controlling an operation for achieving a scanner function, a facsimile controller 15 controlling an operation for achieving a facsimile function, a printer controller 17 controlling an operation for achieving a printer function, and a copy controller 19 controlling an operation for achieving a copy function. The main control section 11 has overall control for an operation of the entire copier.

The scanner section 21 includes an image irradiation lamp 23 and a charge coupled device (CCD) sensor 25 constituting a scanner (not shown). The image irradiation lamp 23 irradiates a document and the CCD sensor 25 receives its reflected light, whereby the scanner section 21 reads out an image from the document and outputs image data corresponding to the read-out image to the image processing section 31.

The image processing section 31 includes a correction section 33, an image manipulation section 35, and an image memory 37. The image processing section 31 processes the image data having been read out by the scanner section 21, with use of the correction section 33 and the image manipulation section 35 according to need, and stores the processed image data in the image memory 37 or outputs the processed image data to the engine section 41 and the facsimile communication section 61 etc. The correction section 33 makes a predetermined correction processing such as level correction, gamma correction, and the like to the image data which has been read out by the scanner section 21. The image manipulation section 35 executes a variety of manipulating processing such as compression or expansion and scaling of image data.

The engine section 41 includes a paper conveying section 43 composed of a paper feeding cassette, a paper feeding roller, etc., which are not shown, an image forming section 45 composed of a photosensitive drum, an exposure system, a development system, etc., which are not shown, a transfer section 47 composed of a transfer roller, etc., (not shown), and a fixing section 49 composed of a fixing roller, etc., (not shown). The engine section 41 prints out an image on a sheet of paper by means of image data which has been read out by the scanner section 21, image data which has been transmitted from a client personal computer (PC) etc., by a Local Area Network (LAN) via the network I/F section 65, and image data of facsimile data which has been received from an external facsimile machine etc., by the facsimile communication section 61. More specifically, the paper conveying section 43 conveys a sheet of paper to the image forming section 45, which forms a toner image corresponding to the foregoing image data. The transfer section 47 transfers the toner image to the sheet of paper. The fixing section 49 fixes the toner image on the sheet of paper to form an image.

Figure 2:
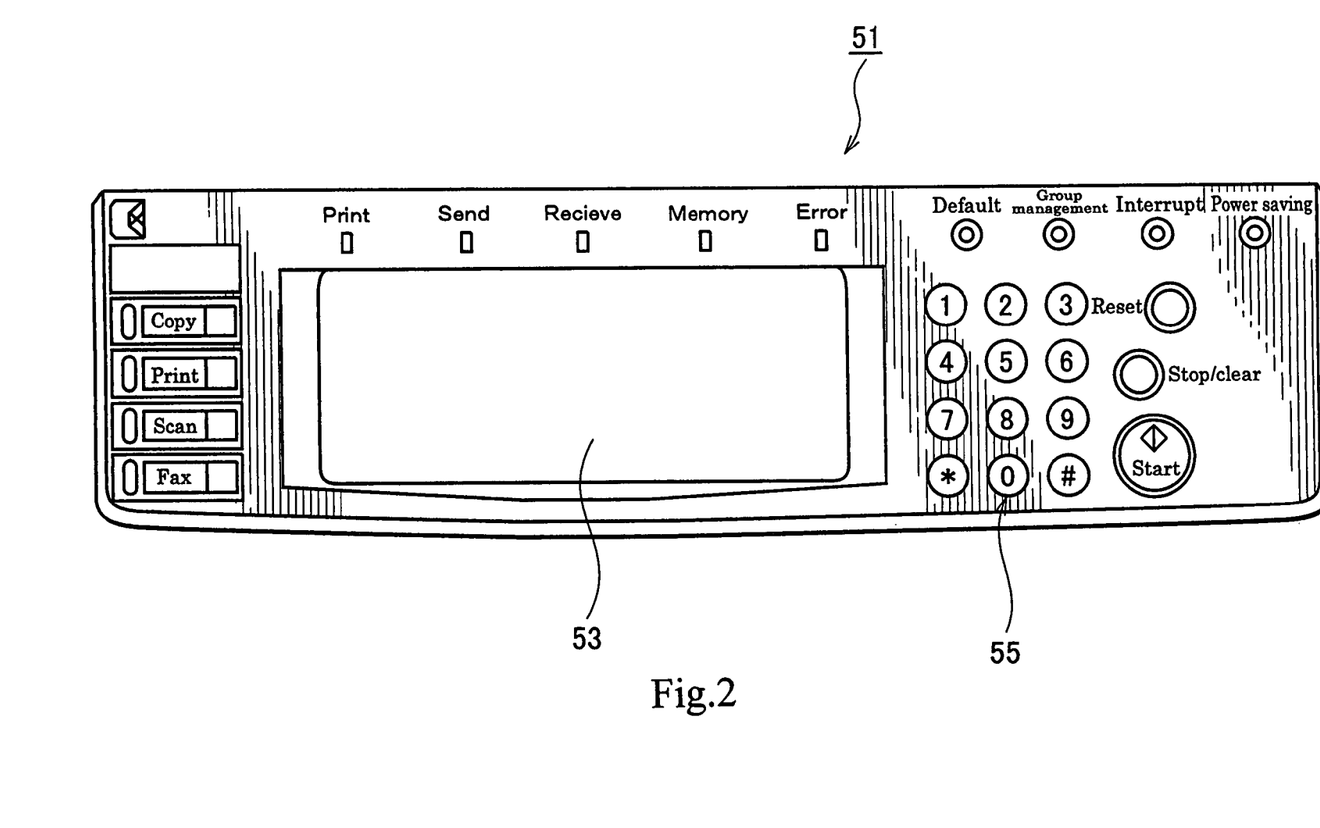
FIG. 2 is an external view of an operation panel section of the image forming apparatus according to the embodiment of the present invention.

The operation panel section 51 includes a touch panel section 53 and an operation key section 55 as shown in FIG. 2. The operation panel section 51 is used in order for a user to carry out an operation related to a scanner function, a facsimile function, a printer function, or a copy function etc. The operation panel section 51 provides the main control section 11 with an operation command, etc., by the user.

The touch panel section (corresponding to a "display section" of the present invention) 53 includes a touch panel unit combined with a touch panel and a color Liquid Crystal Display (LCD). The touch panel section 53 displays a variety of operation screens, for example, information on a document size, a copy size, and the number of copies etc., in executing the copy function, and also displays an operation button and the like in order for the user to input a variety of operation commands by touching a relevant place. Further, the touch panel section 53 is used when conditions of documents (for example, additional information on a current status of processing of each relevant document, permission or prohibition of overwriting, an accumulation period, etc.) having been accumulated in a document box (synonymous with a "document accumulation section" described later; the same shall apply hereinafter) are displayed and also when details of the document (more specifically, which shall mean an image, for example, the same shall apply hereinafter) are displayed.

The operation key section 55 includes a plurality of operation keys for accepting an operation input by the user. The operation key section 55 is used, for example, when the user selectively executes a key input operation of a necessary function from among a variety of functions such as the copy function, the printer function, the scanner function, and the facsimile function, or when the user inputs an operation of the number of copies, a copy execution command, etc. Further, the operation key section 55 is used when an operation of any one of management target documents is specified or when an operation related to processing of reading (previewing) the operation specified document, printing the operation specified document, or transmitting the operation specified document to a necessary destination is specified.

The facsimile communication section 61 includes an encoding/decoding section (not shown), a modulation and demodulation section (not shown), and a Network Control Unit (NCU) (not shown). The facsimile communication section 61 transmits image data of a document having been read by the scanner section 21 to a facsimile machine via a telephone line and receives image data having been transmitted from a facsimile machine etc.

The HDD 63 has a storage area for a plurality of document boxes and stores image data having been read out by the scanner section 21 and a variety of data such as an output format being set in the image data. The image data stored in the HDD 63 is not only used inside the image forming apparatus, a program, and a recording medium but also checked from a client PC, etc., via the network I/F section 65 or transferred to a predetermined folder on a client PC, a file transfer protocol (FTP) server, etc., if necessary.

The network I/F section 65 controls transmission and reception of a variety of data with respect to a client PC, etc., connected via the LAN, with use of a network interface (10/100Base-TX) etc.

With the aim of providing an image forming apparatus capable of highly detailed updating and managing in real time a status of a management target document that changes every moment and also dynamically updating and managing stored information on an accumulated document along with changes in the grasped condition of the document, the main control section 11 includes an operation information acquisition section 71 acquiring operation information when a user specifies an operation for a document in line with his/her intention and its related processing from among documents displayed on a display screen of the touch panel section 53, a document accumulation section 73 in which information of each of a plurality of documents is accumulated, an additional information storage section 74 storing additional information on a current status of processing of each of the plurality of documents, permission or prohibition of overwriting, and an accumulation period as associated with each appropriate document, a current status determination section 75 performing processing for determining a current status of processing of a relevant document based on the operation information having been acquired in the operation information acquisition section 71, and a document management section 77 updating and managing stored information on an accumulated document in the document storage section 73 based on the additional information having been read out from the additional information storage section 74 by releasing for a new document a storage area for a document associated with additional information that overwriting is permitted and allocating the released storage area to the new document. The document management section 77 has a function of updating and managing stored information in the additional information storage section 74 based on the current status of processing of the relevant document having been stored in the additional information storage section 74 and the current status of processing of the document having been determined by the current status determination section 75 in such a manner as to change a current status of processing of an unread document from unread to read when details of operation information having been acquired in the operation information acquisition section 71 regard an operation related to processing that targets all the pages of the unread document, whereas to change a current status of processing of an unread document from unread to hold when the details of operation information regard an operation related to processing that targets a part of the pages of the unread document. In the following, as a current status of processing of a document, description is given as exemplifying each status of, for example, unread that indicates being unprocessed, hold that indicates being in the course of processing, and read that indicates having been processed.

Next, the operation of the image forming apparatus according to the embodiment of the present invention is described with reference to FIGS. 3 to 6.

First, a flow of processing when a user specifies an operation of reading (previewing) an unread document is described.

Figure 3:
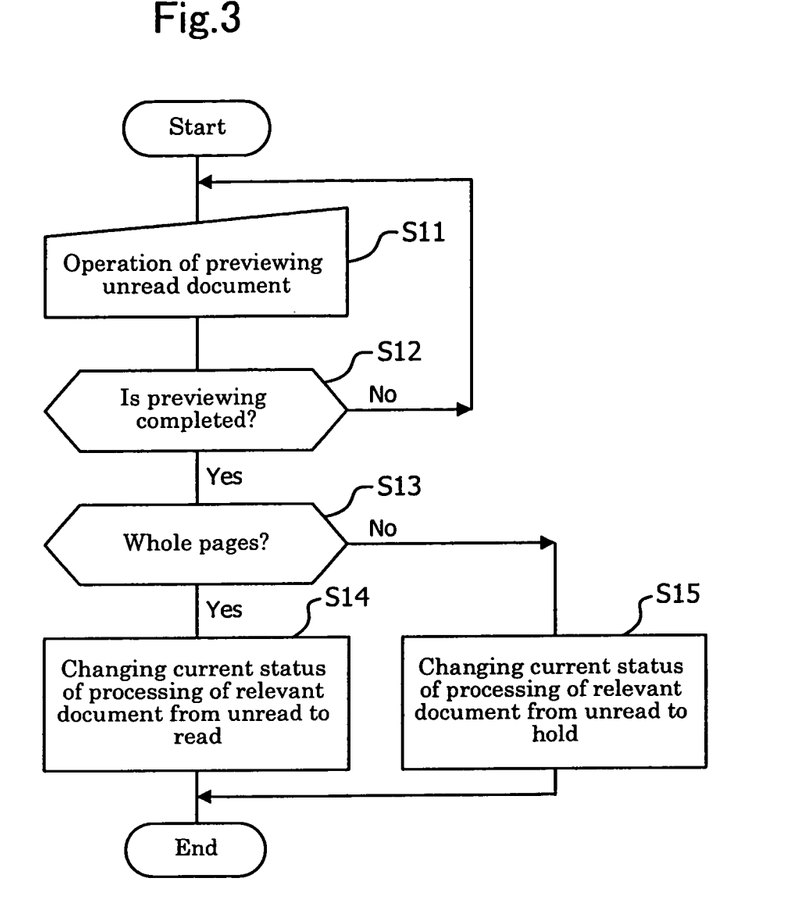
FIG. 3 is an operational flow chart of the image forming apparatus according to the embodiment of the present invention.

When a user attempting to access an unread document in line with his/her intention from among a plurality of documents having been accumulated in the document accumulation section 73 specifies an operation of reading (previewing) the unread document via the operation key section 55 (Step S11), this operation information is sent to the operation information acquisition section 71.

In response to being provided with the operation information from the operation information acquisition section 71, the current status determination section 75 makes a determination on whether the reading (previewing) of the unread document by the user is completed (Step S12).

When a determination that the reading (previewing) of the unread document by the user is completed is made, as a result of the reading (previewing) completion determination in Step S12, the current status determination section 75 makes a further determination on whether the reading (previewing) of all the pages of the document by the user is completed, based on the operation information from the operation information acquisition section 71 (Step S13).

When a determination that the reading (previewing) of all the pages of the document by the user is completed is made, as a result of all page reading (previewing) determination in Step S13, the document management section 77 updates and manages the stored information in the addition information storage section 74 so as to change the current status of processing of the document from unread to read. At the same time, along with the updating, the document management section 77 updates displayed information of the document related to the updating on the display screen of the touch panel section 53 (Step S14).

On the other hand, when a determination that the reading (previewing) of a part of the pages of the document by the user is completed is made, as a result of all page reading (previewing) determination in Step S13, the document management section 77 updates and manages the stored information on the document in the additional information storage section 74 so as to change the current status of processing of the document from unread to hold. At the same time, along with the updating, the document management section 74 updates displayed information of the document related to the updating on the display screen of the touch panel section 53 (Step S15).

Now, an example of a display screen after the updating in Step S14 and Step S15 is described. In an embodiment in FIG. 5, a document list is displayed with each document status, without being sorted according to the current status of each document. As the status of each document, "undone" indicating being unprocessed, "hold" indicating being in the course of processing, and "done" indicating having been processed can be exemplified. Also, the number of items of a document belonging to each current status is displayed on the heading portion 81 in such a manner that there are 2 items of "unread" indicating being unprocessed, 2 items of "hold" indicating being in the course of processing, and 1 item of "read" indicating having been processed. Further, permission or prohibition of overwriting is adopted as the status of each document. More specifically, in the screen example of FIG. 5, a "symbol mark of locking" 83 symbolically indicating that overwriting is prohibited is displayed as associated with an unread document in which overwriting is prohibited, whereas a "symbol mark of unlocking" 85 symbolically indicating that overwriting is possible is displayed as associated with a read document or a hold document in which overwriting is permitted (although there is a case where overwriting is prohibited, which will be described later). Details of the permission or prohibition of overwriting will be described later.

Figure 6:
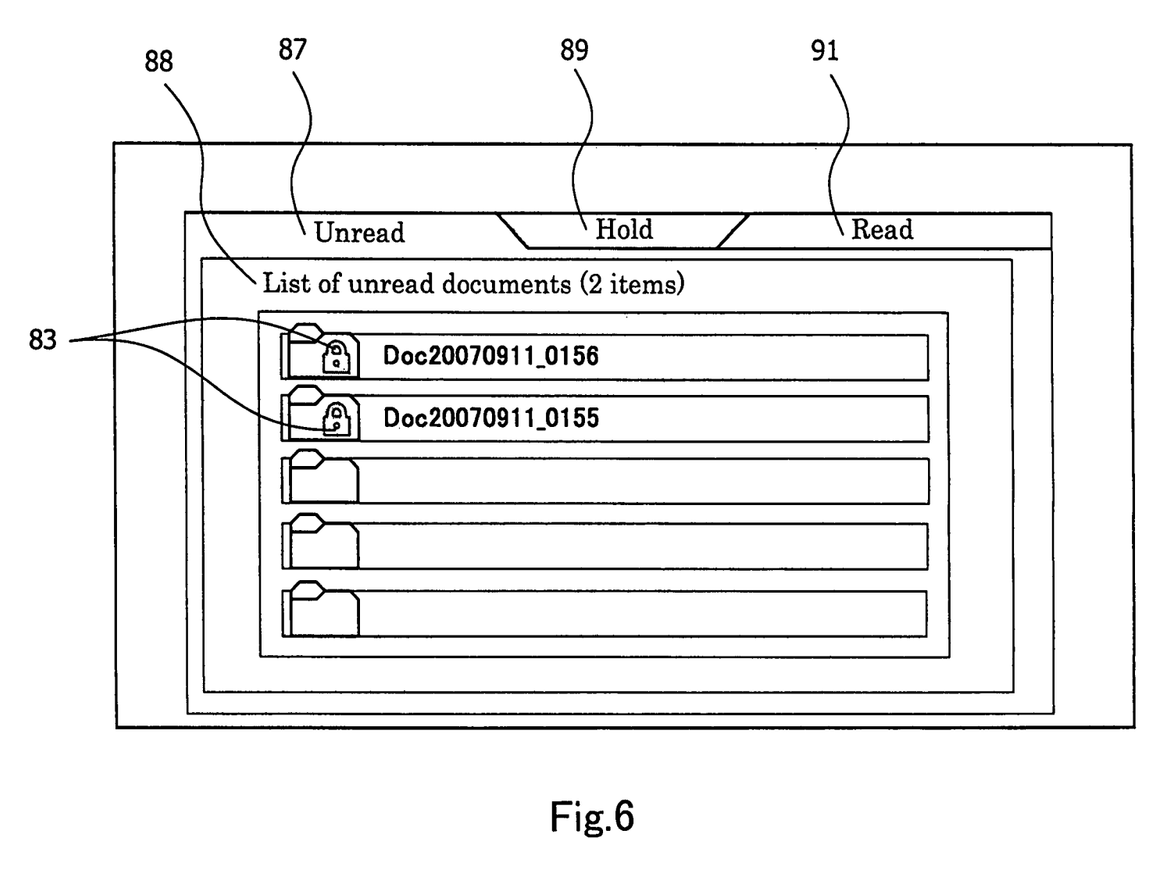
FIG. 6 is a diagram showing a screen example displaying a document list as sorted into a folder for each current status of each document.

In an embodiment shown in FIG. 6, on the other hand, a document list is sorted and stored into a folder (tab) 87, 89, or 91 having been preset for each current status (unread, hold, or read) of each document, whereupon the current status of each document is displayed. The embodiment is an example of a display screen on the occasion when the "unread" folder (tab) 87 indicating being unprocessed is selected by a user, where a list of unread documents related to the "unread" folder (tab) 87 is displayed on the heading portion 88 with the effect that the number of items of a document belonging to the unread group is "2 items." In the same manner as the example in FIG. 5, the "symbol mark of locking" 83 symbolically indicating that overwriting is prohibited is displayed as associated with an unread document in which overwriting is prohibited.

Figure 5:
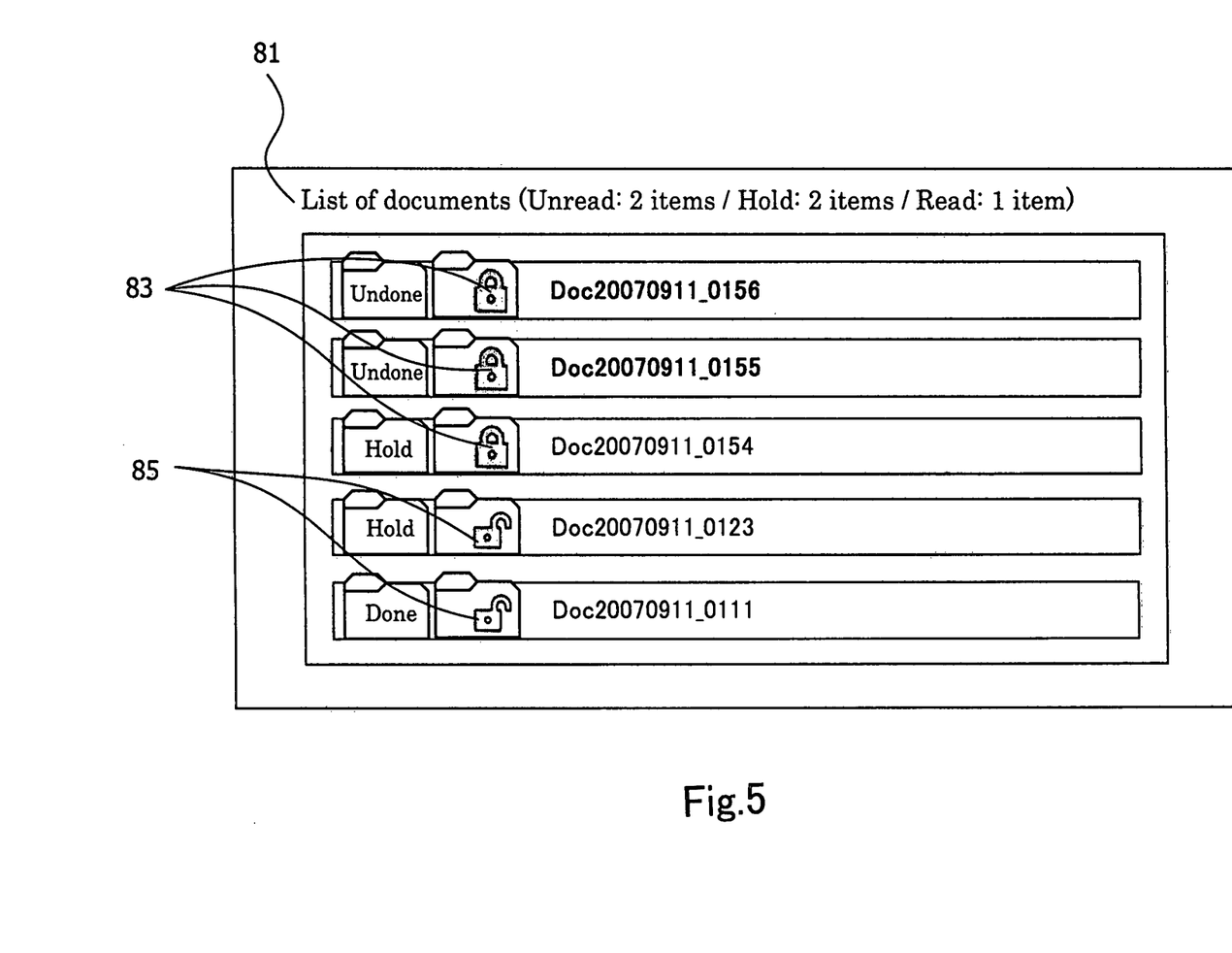
FIG. 5 is a diagram showing a screen example displaying a document list with a status of each document.

As above, the document management section 77 updates and manages stored information in the additional information storage section 74 based on the current status of processing of the document having been stored in the additional information storage section 74 and the current status of processing of the document having been determined in the current status determination section 75 in such a manner as to change a current status of processing of an unread document from unread to read when details of operation information having been acquired in the operation information acquisition section 71 regard an operation related to processing that targets all the pages of the unread document (operation of reading (previewing) all the pages in the embodiment), whereas to change a current status of processing of an unread document from unread to read when the details of operation information regard an operation related to processing that targets a part of the pages of the unread document (operation of reading (previewing) a part of the pages in the embodiment). By this means, a status of a management target document that changes every moment is configured to be updated and managed in high detail in real time and to be clearly presented to a user. Thus, it becomes possible for the user to grasp the current status of the management target document at a glance by visually identifying the document list as shown in FIG. 5 or FIG. 6. As a result, the convenience of document management can be enhanced significantly.

Figure 4:
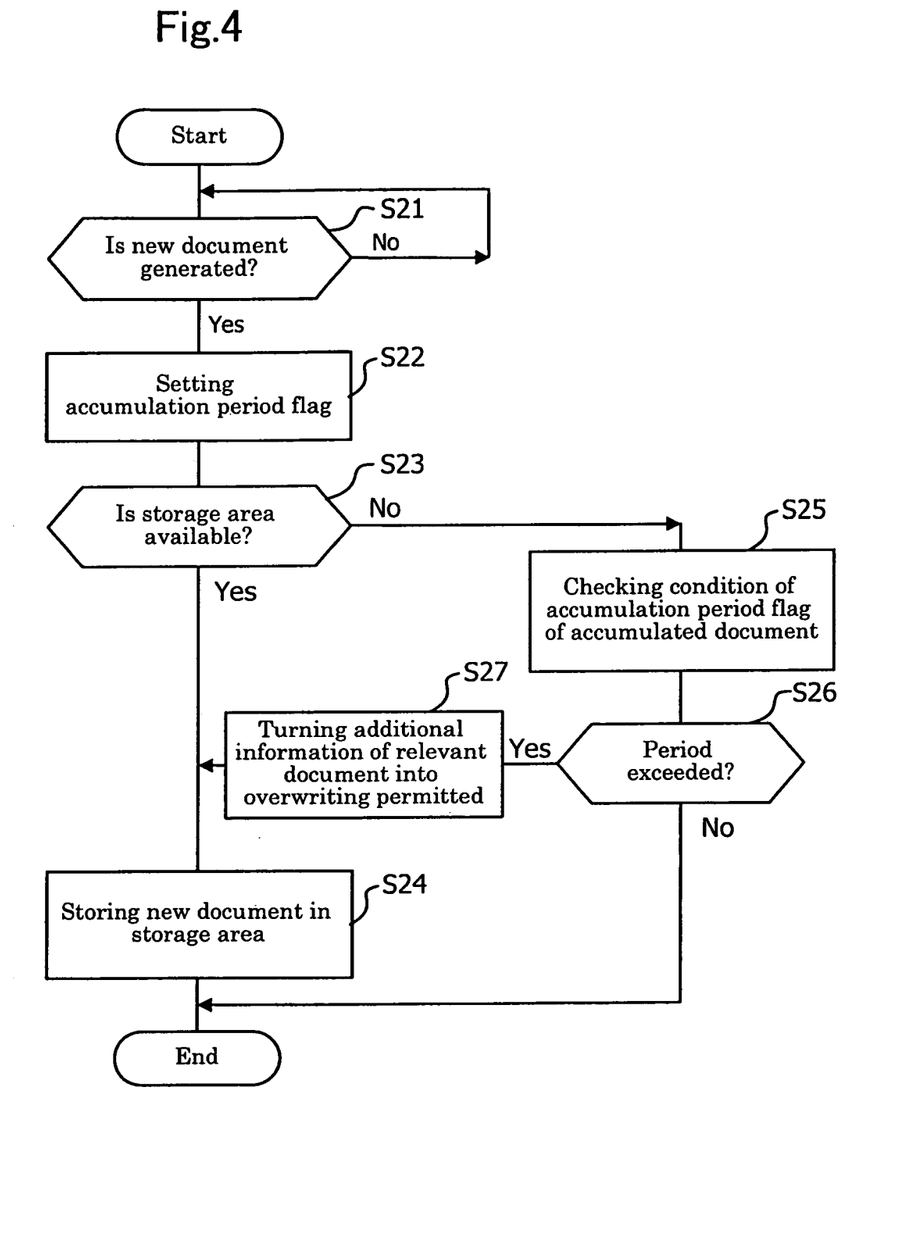
FIG. 4 is another operational flow chart of the image forming apparatus according to the embodiment of the present invention.

Next, a flow of processing on the occasion when a new document is generated according to a user's operation instructions is described with reference to FIG. 4.

First, a flow of processing on the occasion when a new document is generated and also when a storage capacity for accumulating the new document is sufficient is described. In Step S21, the document management section 77 continuously monitors generation of a new document. When a new document is generated during the monitoring, the document management section 77 initializes (for example, sets at "0" as an initial value) an accumulation period flag that is additional information on an accumulation period for the new document. Herein, a value of the accumulation period flag is rewritten and managed appropriately according to an accumulation period of the document in such a manner that when the accumulation period of the document is within a predetermined period (for example, a period appropriately settable in accordance with a user's intention such as one month) "0" is written, whereas when the accumulation period of the document exceeds the predetermined period "1" is written.

Subsequently, the document management section 77 checks a busy condition of the storage area in the document accumulation section 73, thereby making a determination on whether a storage capacity for accumulating the new document is sufficient (Step S23). In Step S23, the document management section 77 branches the flow of processing to be followed, based on a determination result on whether the storage capacity for accumulating the new document is sufficient. In the case of this embodiment, since the storage capacity for accumulating the new document is sufficient from the precondition, the document management section 77 is to move the flow of processing on to Step S24.

In Step S24, the document management section 77 stores the new document having been generated in Step S21 in an area for the unread folder in the storage area in the document accumulation section 73, and then terminates the flow of a series of processing.

The aforementioned Steps S21 to S24 are a flow of processing on the occasion when a new document is generated and also when the storage capacity for accumulating the new document is sufficient.

Next, a flow of processing on the occasion when a new document is generated and also when the storage capacity for accumulating the new document is insufficient is described. When a determination that the storage capacity for accumulating the new document is insufficient is made, as a result of the determination in Step S23, the document management section 77 checks a condition of the accumulation period flag that is additional information on the accumulation period of the accumulated document (Step S25). When there is no document extracted in which "1" indicating that the accumulation period exceeds a predetermined period is written in the accumulation period flag ("No" of Step S26), as a result of the check, the document management section 77 regards the storage capacity for accumulating the new document as insufficient, displays on a display screen of the touch panel section 53 a message, for example, "The memory is full. Delete an existing document to register a new document." and terminates the flow of a series of processing.

On the other hand, when there is a document extracted in which "1" indicating that the accumulation period exceeds a predetermined period is written in the accumulation period flag ("Yes" of Step 26), as a result of the determination in Step S26, the document management section 77 turns a condition related to permission or prohibition of overwriting of the document in which "1" is written in the accumulation period flag into "overwriting permitted" uniformly (Step S27). That is, the document management section 77 is configured to update and manage stored information on an accumulated document in the document accumulation section 73 by releasing for a new document the storage area for a document as associated with additional information that overwriting is permitted and allocating the released storage area to the new document.

In Step 24, the document management section 77 stores the new document having been generated in Step S21 in a storage area having been released through the processing in Step S27 in the storage area in the document accumulation section 73, and then terminates the flow of a series of processing.

Now, the condition related to permission or prohibition of overwriting that is one piece of additional information in each of a plurality of documents is described as giving a specific example. As the condition related to permission or prohibition of overwriting, for example, "overwriting prohibited" for an unread document, "overwriting permitted" for a read document, and either one of "overwriting prohibited" or "overwriting permitted" for a hold document are associated with each document as additional information. A reason why the example of associating either one of "overwriting prohibited" or "overwriting permitted" as the condition related to permission or prohibition of overwriting for the hold document is given is based on that, for example, it is usually the case in the hold document that an important document of which due consideration is desired later and an unnecessary document left remaining held are mixed in a jumbled state of good and bad. In the present embodiment, a document whose hold condition has been maintained longer than the aforementioned predetermined period (for example, one month) is considered as already an unnecessary document since it is usually the case that an important document would be processed at an early stage by a user. Thus, the present embodiment is configured to turn a condition related to permission or prohibition of overwriting of such an unnecessary document into "overwriting permitted" uniformly regardless of the condition related to permission or prohibition of overwriting in such a manner as to maintain the condition as it is if "overwriting permitted" whereas to rewrite the condition to "overwriting permitted" if "overwriting prohibited." However, the foregoing embodiment is not described for restricting the present invention. The present invention can set the condition related to permission or prohibition of overwriting of each document appropriately according to a user's intention, other than the foregoing embodiment, such as turning a condition related to permission or prohibition of overwriting of an unread document into "overwriting permitted" or turning a condition related to permission or prohibition of overwriting of a read document into "overwriting prohibited," etc.

According to the image forming apparatus in accordance with the embodiment of the present invention, as described above, the document management section 77 updates and manages stored information in the additional information storage section 74 based on the current status of processing of the document having been stored in the additional information storage section 74 and the current status of processing of the document having been determined in the current status determination section 75 in such a manner that when details of operation information having been acquired in the operation information acquisition section 71 regard an operation of processing that targets all the pages of an unread document (operation of reading (previewing all the pages in the embodiment), the document management section 77 changes the current status of processing of the document from unread to read, whereas when the details of operation information regard an operation of processing that targets a part of the pages of an unread document (operation of reading (previewing) apart of the pages in the embodiment), the document management section 77 changes the current status of processing of the document from unread to hold. By this means, a current status of a management target document that changes every moment is configured to be updated and managed in high detail in real time and clearly presented to a user. Consequently, it becomes possible for the user to grasp the current status of the management target document at a glance by visually identifying the document list as shown in FIG. 5 or FIG. 6. As a result, the convenience of document management can be enhanced significantly.

Further, according to the image forming apparatus in accordance with the embodiment of the present invention, the document management section 77 updates and manages stored information in the document accumulation section 73 based on additional information having been read out from the additional information storage section 74 by releasing for a new document a storage area for a document associated with additional information that overwriting is permitted and allocating the released storage area to the new document, for example, when a new document is generated and also when a storage capacity for accumulating the new document in the document accumulation section 73 is insufficient. Thus, the condition of the management target document that changes every moment can be updated and managed in high detail in real time. Additionally, stored information on an accumulated document can be updated and managed dynamically along with changes in a grasped condition of a document.

The present invention should not be restricted to the aforementioned embodiment and can be modified as appropriate without departing from the gist or technical idea of the present invention understood from the claims and the specification. Image forming apparatuses with such modifications are also to fall within the technical scope of the present invention.

More specifically, a mode of updating and managing stored information in the additional information storage section 74 in such a manner that when details of operation information having been acquired in the operation information acquisition section 71 regard an operation of reading (previewing) all the pages of an unread document, the current status of processing of the document is changed from unread to read, whereas when the details of operation information regard an operation of reading (previewing) a part of the pages of an unread document, the current status of processing of the document is changed from unread to hold is exemplarily described in the embodiment of the present invention. However, the present invention is not restricted to this embodiment. More specifically, "processing of a document" in the present invention includes processing of printing the document or transmitting the document to a necessary destination, etc., other than reading (previewing) in accordance with the foregoing embodiment.

Accordingly, it should be understood that the following modes are construed as being within the technical scope of the present invention; a mode of updating and managing stored information in the additional information storage section 74 in such a manner that when details of operation information having been acquired in the operation information acquisition section 71 regard an operation of printing all the pages of an unread document, the current status of processing of the document is changed from unread to read, whereas when the details of operation information regard an operation of printing a part of the pages of an unread document, the current status of processing of the document is changed from unread to hold, and a mode of updating and managing stored information in the additional information storage section 74 in such a manner that when details of operation information having been acquired in the operation information acquisition section 71 regard an operation of transmitting all the pages of an unread document, the current status of processing of the document is changed from unread to read, whereas when the details of operation information regard an operation of transmitting a part of the pages of an unread document, the current status of processing of the document is changed from unread to hold.

What is claimed is:

1. An image forming apparatus comprising:
a document accumulation section in which information of each of a plurality of documents is accumulated;
an additional information storage section storing additional information on a current status of processing of each of the plurality of documents as associated with each relevant document;
a display section for displaying various information on each of the plurality of documents on a display screen;
an operation information acquisition section acquiring operation information when a user specifies an operation for a document in line with his/her intention and its related processing from among the various information on documents having been displayed on the display screen;
a current status determination section determining a current status of processing of the document based on the operation information having been acquired in the operation information acquisition section; and
a document management section updating and managing stored information in the additional information storage section based on the current status of processing of the document having been stored in the additional information storage section and the current status of processing of the document having been determined in the current status determination section; and
wherein the current status of processing of the document includes each status of unread that indicates being unprocessed, hold that indicates being in the course of processing, and read that indicates having been processed;
wherein the document management section updates and manages stored information in the additional information storage section in such a manner that when details of operation information having been acquired in the operation information acquisition section regard an operation of processing that targets all the pages of an unread document, the current status of processing of the document is changed from unread to read, whereas when the details of operation information regard an operation that targets a part of the pages of an unread document, the current status of processing of the document is changed from unread to hold;
wherein the document management section stores each document belonging to each current status into a relevant folder among a plurality of folders having been preset for each current status of processing of the document; and
wherein the document management section when the stored information in the additional information storage section is updated, moves a document related to the updating, to a relevant folder along with the updating.

2. The image forming apparatus according to claim 1, wherein the processing of the document includes any one of reading the document, printing the document, or transmitting the document to a necessary destination.

3. The image forming apparatus according to claim 1, wherein when the stored information in the additional information storage section is updated, the document management section updates displayed information of a document related to the updating on the display screen, along with the updating.

4. The image forming apparatus according to claim 3, wherein the displayed information of the document related to the updating is the current status of processing of the document and the number of items of a document belonging to each current status.

\* \* \* \* \*